United States Patent [19]
Montgomery et al.

[11] Patent Number: 5,431,227
[45] Date of Patent: Jul. 11, 1995

[54] METHOD FOR REAL TIME PROCESS CONTROL OF WELL STIMULATION

[75] Inventors: Carl T. Montgomery; Yih-Min Jan, both of Plano, Tex.

[73] Assignee: Atlantic Richfield Company, Los Angeles, Calif.

[21] Appl. No.: 169,697

[22] Filed: Dec. 20, 1993

[51] Int. Cl.$^6$ ............................................. E21B 43/28
[52] U.S. Cl. .................... 166/307; 166/113; 166/250
[58] Field of Search ............... 166/250, 281, 282, 307, 166/113; 73/155, 152

[56] References Cited

U.S. PATENT DOCUMENTS

| | | | |
|---|---|---|---|
| 3,595,075 | 7/1971 | Dower | 73/155 |
| 4,535,851 | 8/1985 | Kirkpatrick et al. | 175/48 X |
| 5,279,153 | 1/1994 | Dussan et al. | 166/100 X |

OTHER PUBLICATIONS

"Development of a Matrix Acidizing Stimulation Treatment Evaluation and Recording System (MASTERS)", C. T. Montgomery, et al., SPE 26579, 68th Annual Tech. Conf., Houston, Tex. Oct. 3–6, 1993.

"Development and Application of an Operator's Stimulation Monitoring System", C. M. Pearson, SPE 16903, 62nd Annual Tech. Conf., Dallas, Tex. Sep. 27–30, 1987.

"Improving Fracturing Design Through the Use of an On-Site Computer System", G. D. Cooper, et al., SPE 12063 presented at the 1983 Annual Tech. Conf., San Francisco, Calif., Oct. 5–8, 1983.

"Improved Quality Control of Fracture Treatments Using Advanced Data Collection/Analysis Equipment", C. M. Pearson, et al., CIM/SPE 90–94, CJM Annual Meeting, Calgary, Jun. 10–13, 1990.

"New Method Proves Value of Stimulation Planning", G. Paccaloni, Oil and Gas J., pp. 155–160, Nov. 19, 1979.

"Field History Verifies Control, Evaluation", G. Paccaloni, Oil and Gas J., pp. 61–65, Nov. 26, 1979.

"Key Factors for Enhanced Results of Matrix Stimulation Treatments", G. Paccaloni, et al., SPE 17154, presented at the SPE Formation Damage Control Symposium, Bakersfield, Calif., Feb. 8–9, 1988.

"Advances in Matrix Stimulation Technology", G. Paccaloni, et al., J. Pet. Technology, pp. 256–263, Mar., 1993.

"Real-Time Evaluation of Matrix Acidizing Treatments", L. P. Prouvost, et al., Journal of Petroleum Science and Engineering, 1 (1987) 145–154.

"Applications of Real-Time Matrix-Acidizing Evaluation Method", L. P. Prouvost, et al., SPE Production Engineering, Nov., 1989, pp. 401–407.

"A Practical Companion to Reservoir Stimulation", p. H-8, Schlumberger Educational Services, 1991.

Primary Examiner—William P. Neuder
Attorney, Agent, or Firm—Joseph E. Rogers

[57] ABSTRACT

A system and method for matrix stimulation field monitoring providing real time control, optimization and post job evaluation of matrix treatments is disclosed herein. Using calculated or measured bottom hole pressures or coil tubing reflective pressures, the system and method predicts pre-treatment damage or skin from a step rate test, then shows the evolution of skin removal versus treating fluid volume in real time. The method and system provides real time information about diverter use, treatment height, damage radius and other important well parameters.

12 Claims, 6 Drawing Sheets

METHOD FOR REAL TIME PROCESS CONTROL OF WELL STIMULATION

FIELD OF THE INVENTION

This invention relates to the matrix treatment of wellbores and more particularly, a method for optimizing the treatment efficiency while matrix acidizing.

BACKGROUND OF THE INVENTION

The economic success of stimulation treatments such as matrix acidizing often cannot be evaluated until after several months of production following clean up of the well and recovery of the injected fluid from such treatments. The initial evaluation of the engineering design must therefore be made from data obtained on site either immediately prior to the treatment, during the pumping, or immediately following shut down. Since the early 1980's, advances in monitoring stimulation treatments have included the use of microcomputers to gather digital data records.

This technology is widely used in hydraulic fracturing to calculate bottomhole treating pressures, determine formation response to the treatment and to model the growth of hydraulic fractures. Techniques to analyze pressure falloff data and pressure data obtained during the treatment have found widespread application. Despite the wide usage of matrix stimulation, a significant portion of matrix treatments fail to improve well productivity. There are several reasons for such failures, including incorrect field procedure, incorrect design or using the wrong fluid for stimulation. In particular, it appears that there are significant problems in the area of sandstone acidizing.

Current practices for selecting wells for matrix treatment are by evaluating production and water injection history, or by pressure buildup analysis. Design techniques are based on rules of thumb and past experience. Onsite monitoring and execution tools for matrix acidizing are generally based on analog pressure gauges, together with a barrel or pump stroke counter. Unlike hydraulic fracturing, real time quality control, job monitoring and job optimization is not widely practiced or available.

Thus, there exists a need for real time process control and monitoring for such jobs in order to optimize their effectiveness.

SUMMARY OF THE INVENTION

We have discovered an improved real time process control method for matrix acidizing of wells, which includes: estimating the condition of the well; pumping a first predetermined fluid into the well; measuring the pressure at the well head; measuring the flow rate of the predetermined fluid; calculating the skin factor of the well in real time using an assumed value of K-h and the pressure; monitoring the calculated value of skin factor until there is no further change in the value of the skin factor; and changing the second predetermined fluid based on the lack of further decrease in the value of skin factor thereby maximizing the effectiveness of well stimulation.

We have also developed a system for matrix acidizing a well which includes: a general purpose computer for determining on a real time basis the skin factor of a well undergoing a matrix stimulation process; pressure sensor electrically connected to the computer to permit monitoring the well bore pressure; and a flow rate measuring device electrically connected to the computer for measuring the flow rate of a fluid being injected into the well bore.

The present invention allows the real time matrix stimulation monitoring and analysis system to be used on location and to do post job analysis of matrix treatment, thereby solving the problems of the prior art while maximizing the effectiveness and allowing the alteration of job procedures in real time in order to accomplish effective matrix stimulation. More specifically, the invention can aid in optimizing pumping volumes for matrix treatments determining the optimized time to drop the diverter, determining damage radius, reservoir height, and permeability and determining the character of water injection wells. The invention has the advantage of reducing the failure rate of matrix acidizing treatments, as well as productivity or injectivity improvements and cost savings.

DESCRIPTION OF THE PREFERRED EMBODIMENTS

Applicant's invention can be best understood by referring to the figures in conjunction with the detailed description below.

Figure 1:
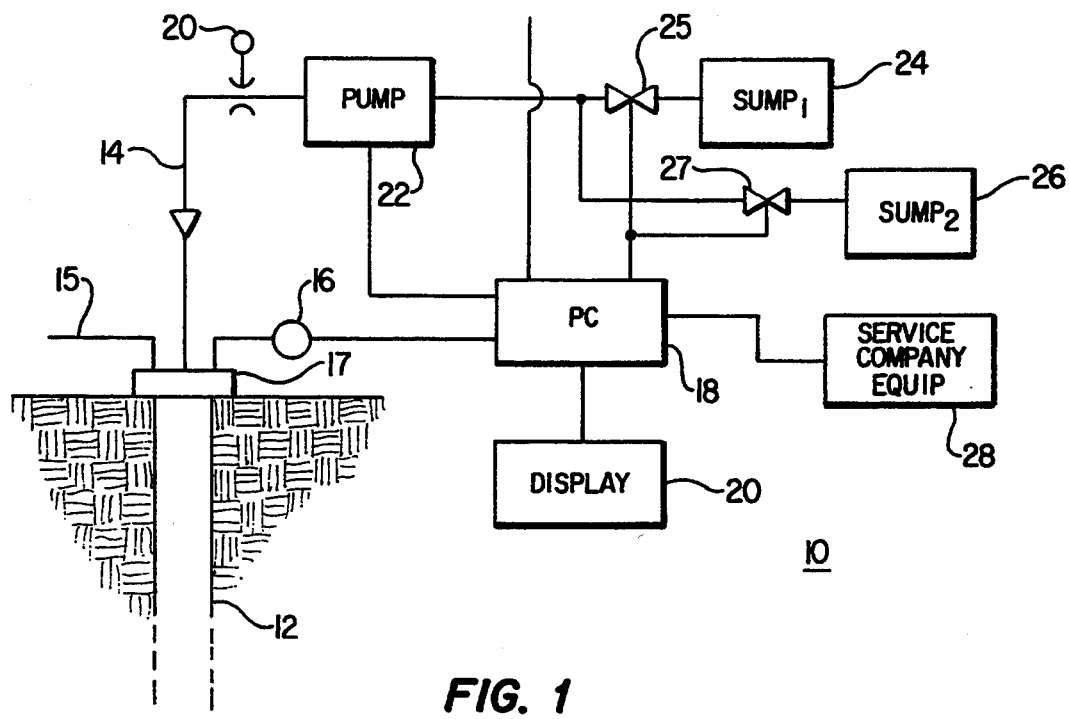
FIG. 1 shows a matrix acidizing stimulation treatment evaluation and recording system.

FIG. 1 shows a matrix acidizing stimulation treatment and recording system 10. A basic system comprises a pump 22, whose suction is connected to a treatment fluid sump 24 or 26 and whose discharge is connected to a wellbore 12 which is to be treated. The wellbore has a discharge for such treatment fluids through line 15. In addition, a pressure sensor 16 can be attached to the top of the wellbore assembly 17. Pressure sensor can be either a bottomhole pressure sensor or a surface mounted sensor capable of providing information from which the bottomhole pressure can be calculated as are well known in the art. The output of sensor 16 is electrically connected to a general purpose computer 18. In addition, a flow detector 20, which may be any suitable flow detector many of which are well known in the art, is positioned on the discharge of pump 22 having its output signal electrically connected to general purpose computer 18.

Computer 18 may be one of several which are well known in the art and might be configured as follows:

1. a 386 or higher IBM MS DOS compatible computer;
2. minimum of 4 megabytes of RAM;
3. VGA (with minimum 256K of video RAM) graphic capability;
4. minimum of 80 megabytes memory of hard disk;

5. 3.5 inch floppy disc drive;
6. RS 232 communication port;
7. a printer/plotter (not shown); and
8. DOS 5.0 or above, Windows ® 3.1 and above and a Math Coprocessor.

With appropriate software modifications, any computer using any operating system could be advantageously used to practice the invention.

The computer 18 with this software can easily be interfaced through the RS 232 port (not shown) to either another computer or to a data acquisition system (not shown). This approach makes the system very adaptable to different levels of onsite monitoring. The flow measuring device 20 should be capable of monitoring a range of flow rates. (For example, 0 to 10 barrels per minute capable of being read in at least 0.25 barrel per minute rate increments.) While pressure sensor 16 is shown alone, it may in fact incorporate two sensing devices to record both the surface treating pressure and the annulus pressure. A bottom hole pressure measurement may also be provided. The measured data are then fed through the RS 232 port for computer 18.

Figure 2:
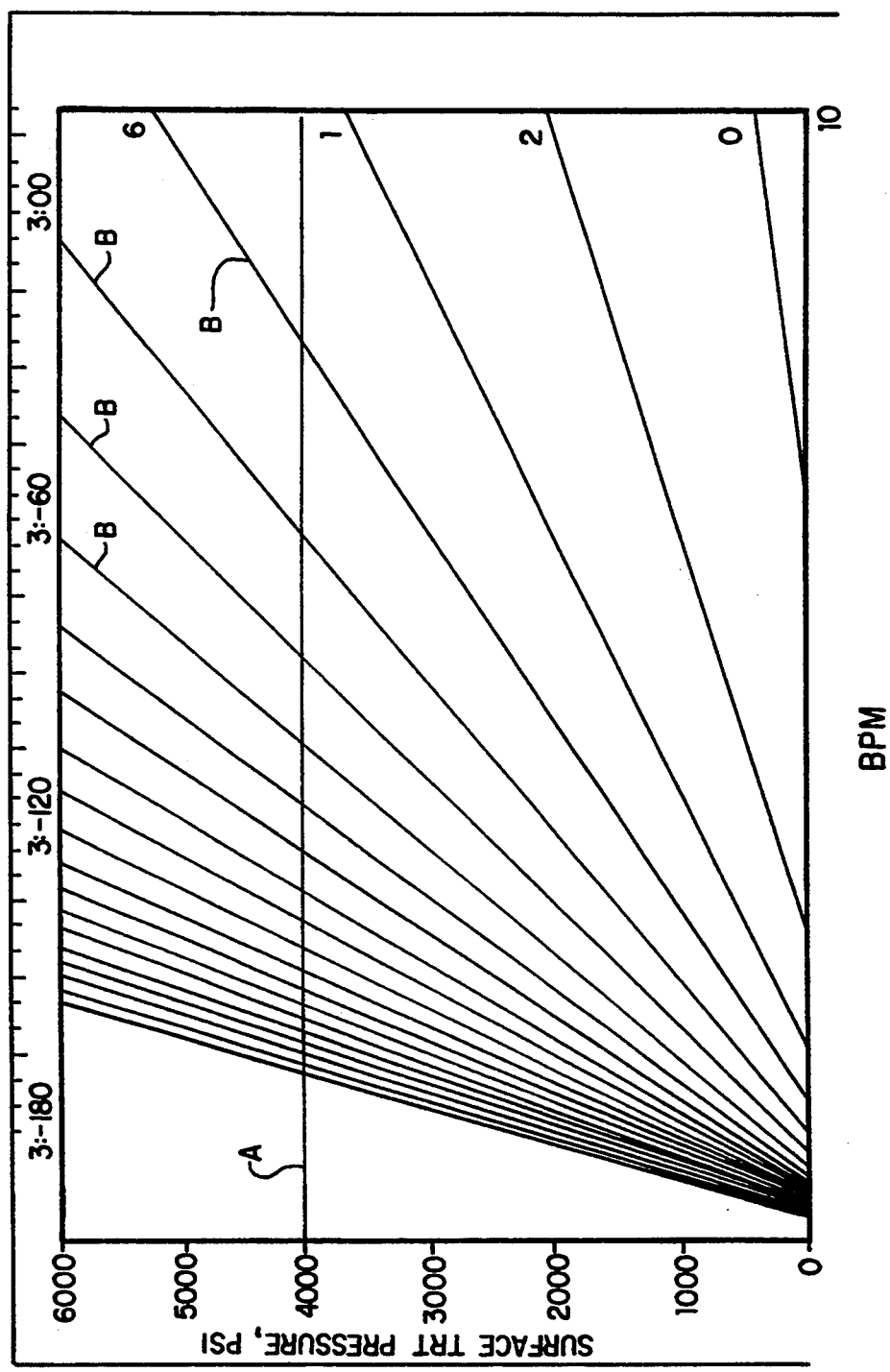
FIG. 2 shows a screen as presented on the display of the matrix acidizing stimulation treatment evaluation and recording system shown in FIG. 1.

FIG. 2 shows a screen as presented on the display of the matrix acidizing stimulation treatment evaluation and recording system shown in FIG. 1. In preparation for conducting a pressure injecting rate - skin test, as is well known in the art. The test would link measurable injection parameters to a computed real time skin factor. The method, based on the steady state, single phase radial version of Darcy's law, would be:

$$P_{wh} = (P_r - P_h + P_f) + \frac{141.2 q_i \mu}{Kh} \left( \ln \frac{r_d}{r_w} + S \right)$$

Where:

h = reservoir thickness, ft (m)
K = permeability, md
p = pressure, psi [kPa]
$P_f$ = friction pressure, psi [kPa]
$P_h$ = hydrostatic pressure, psi [kPa]
$P_r$ = reservoir pressure, psi [kPa]
$P_{wh}$ = well head pressure, psi [kPa]
$q_i$ = injection rate, STB/D [stock-tank m³/d]
$r_d$ = damage radius, ft [m]
$r_w$ = well radius, ft [m]
S = skin effect, dimensionless
t = time, hrs.
$\mu$ = viscosity, cp. [Pa.s]

This equation is used to link injection rate, treating pressure and production targets to a skin effect of zero. Prouvost extended this work by allowing a continuous comparison of measured and simulated pressures using, for example, a transient response equation such as:

$$\Delta p = \Delta p(t + \Delta t) + \Delta p(\Delta t)$$

Where:
p = pressure in wellbore
t = time
This allows a smooth evolution of injection pressure difference as the flow rate changes.

The software loaded onto computer 18 includes software which embodies these equations in order to calculate a transient or "apparent" skin factor versus time for a wellbore in question.

Before the actual matrix treatment, the results of the step rate test are plotted on an evaluation chart. A zero to one barrel per minute step rate test with 0.25 barrel per minute rate increments is exemplary of the values used in such tests. The results of any suitably performed step rate test many of which may be well known in the art can be used. An example plot of the data obtained during the step rate test is shown in FIG. 2. This display, generated by the computer 18 as described above, shows the fracture pressure A for this particular well as calculated by the software and lines of constant skin factor B. Surface pressure is then plotted as a function of flow rate based upon the equations of Paccaloni and Prouvost described above. Actual data points are then plotted and the operator can thereby interpret the cluster of data point in order to determine the initial skin factor. The method by which the operator arrives at the initial skin factor is discussed below.

Figure 3:
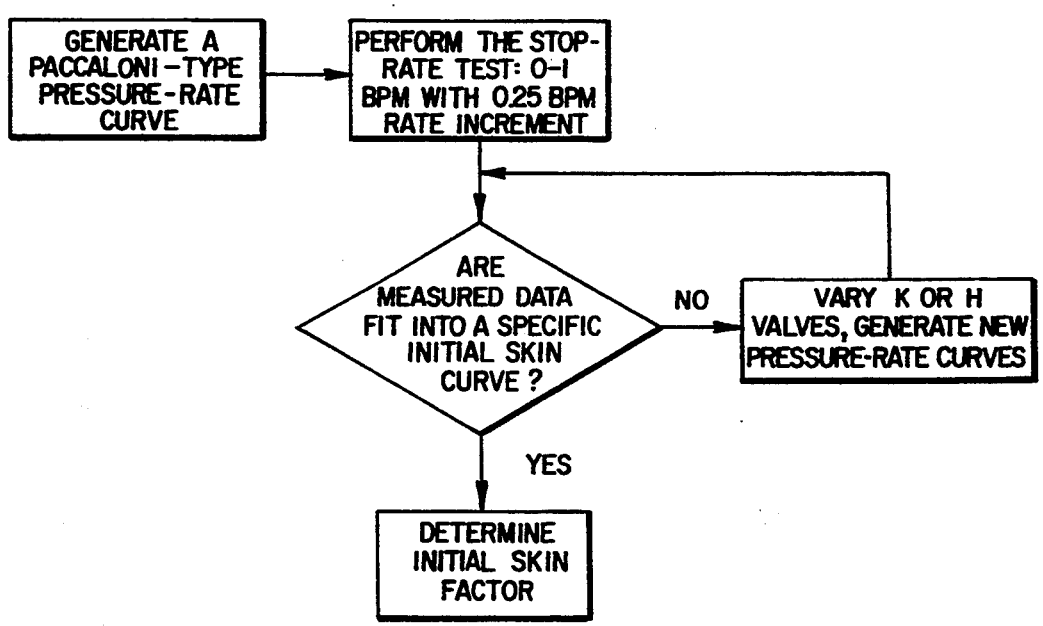
FIG. 3 shows a flow chart of the initial skin factor determination.

FIG. 3 shows a flow chart for the initial skin factor determination. The operator can perform this skin factor determination using the software embodied on computer 18 described above. First, a Paccaloni-type pressure rate curve is generated for the well in test. A step rate test as described above, including using for example 0-1 barrels per minute of injection fluid in 0.25 barrel per minute rate increments. The measured data are reviewed to attempt to fit them into a specific initial skin curve examples of which are given in FIG. 2. If the data do not fit the selected initial skin curve, then the value of K (permeability) or h (reservoir thickness) are varied in order to generate a new pressure rate curve and a fit is once again attempted. This process continues until a fit of the specific initial skin curve and the data from the step rate test fit. When they do fit, the result is an initial skin factor.

Figure 4:
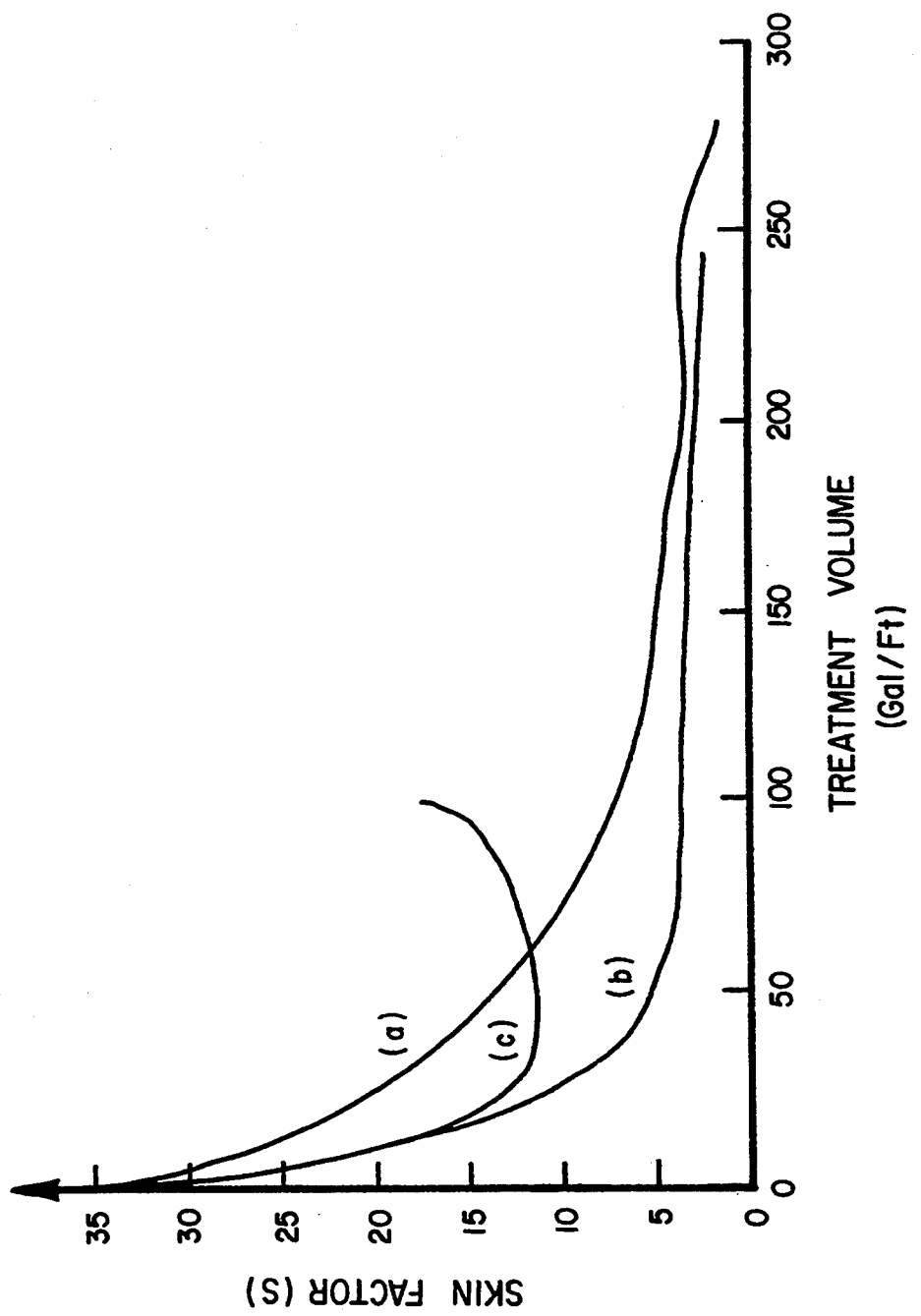
FIG. 4 shows a field acid response curve, typical of matrix acidizing jobs.

FIG. 4 shows a field acid response curve generated in real time from the operation of system 10 and displayed to the operator on display 20. This display can be used to optimize the acid volume during matrix treatments. The optimized volume is determined by monitoring the response curve and when the response curve levels off and reaches its minimum value, the matrix treatment is complete and no further advantage can generally be gained. FIG. 4 shows a plot of skin factor versus treatment volume (gallons per foot of treatment height). The skin factor at the zero treatment volume is the skin factor obtained during the step rate test described above. The treatment volume is the amount of treatment fluid inserted into the well for the given treatment height. For example, the optimized volume for curve A in FIG. 4 is 150 gallons per foot, since the skin factor is nearly a minimum and the slope of the curve is approaching zero. Similarly, for curve B, the optimized volume is approximately 75 gallons per foot. For curve C, the matrix treatment needs to be ended at 50 gallons per foot because the skin factor is increasing at this point.

Figure 5:
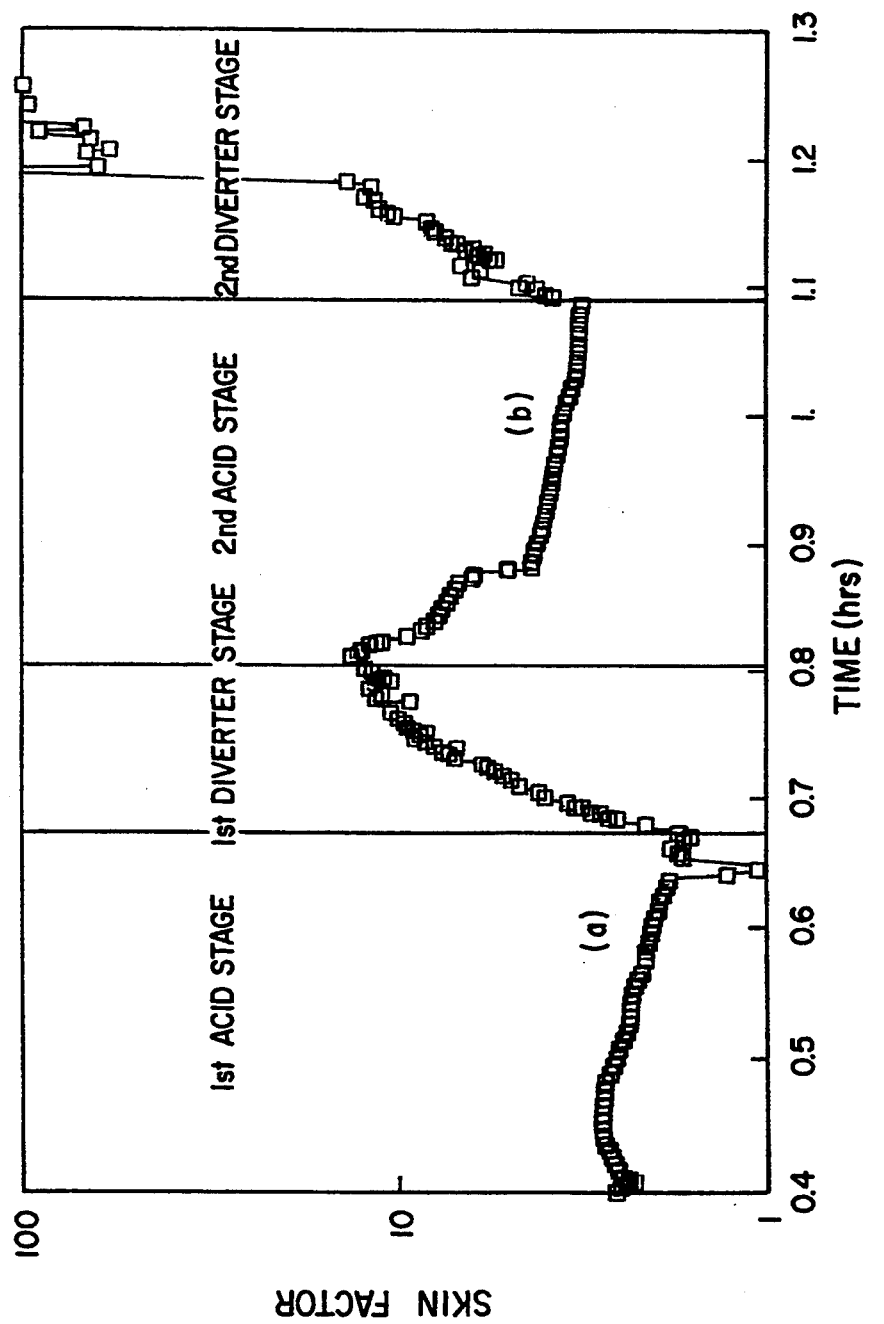
FIG. 5 shows a curve similar to that of FIG. 4 including the use of a diverter.

In addition to permitting the optimization of pumping volumes for matrix treatments, the system can also be used to optimize the time to drop a diverter. FIG. 5 is similar to a display which would be generated for a well being treated and monitored using system 10 including the use of a diverter. As in FIG. 3 when the skin factor as a function of time levels off and reaches its minimum value, the optimized time to drop diverter is indicated. Thus, in curve A, it can be seen that the first diverter was dropped too early because the skin factor was still declining at 0.7 hour and for curve B, in contrast, the second diverter was dropped at nearly an optimum time of 1.1 hours since the skin factor appears to reach a minimum value and the slope is nearly zero.

Figure 6:
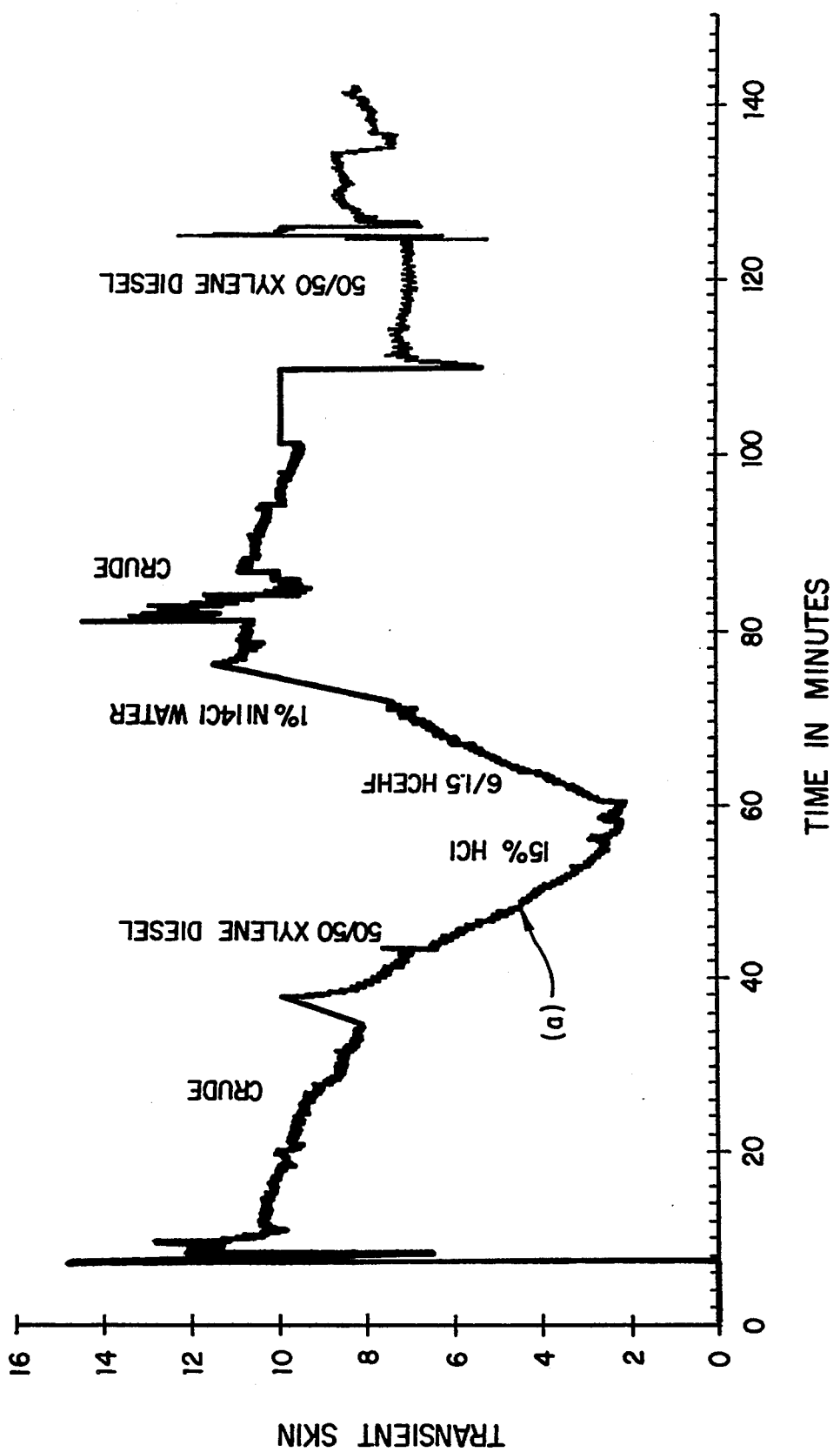
FIG. 6 shows an exemplary matrix acidizing treatment.

A striking example is shown in FIG. 6. FIG. 6 is a graph showing the transient skin factor as a factor of treatment time for various treatments. The goal of each of the treatment steps is to reduce the skin factor of the well, so note that while over portion (a) of the curve, the treatment appears to be reducing the skin factor, as can be seen over portion (a) of the curve. But over portion (b), while the operators are attempting to reduce the skin factor by the addition of certain treatment fluids, the effect is exactly the opposite and skin factor is increasing. This type of error, while potentially undetected in the prior art, would be clearly obvious using this real time processing system. In addition to optimizing the treatment itself, certain other parameters can be determined by using this real time measuring system. Using the Paccaloni equation above, there are three variables whose value and degree of accuracy are normally unknown. These are the reservoir permeability ($K_w$), the height of the treated interval (h) and the radius of damage ($r_d$). An estimate for these parameters can be made using the skin response to a particular treatment. For example, to determine the height of the treated interval in FIG. 5, the skin response at portion (a) is compared to the skin response at portion (b). The reason the skin is higher during portion (b) is because the diverter is causing the treatment to have a higher treating pressure. The pressure is higher either because the permeability is lower or the treatment height is smaller, or a combination of both. An estimate of the treated height and new permeability can be made by adjusting the permeability and treatment height until a slope and skin factor over portion (a) and (b) match.

To determine the radius of damage ($r_d$), the treatment volume, reservoir height and formation porosity are used to compare to the skin evolution. As the treatment proceeds, the radial penetration of the treatment fluid can be calculated at any point. When the skin factor approaches zero, the calculated radial penetration of the treatment fluid will be equal to the radius of damage ($r_d$). In addition, this same system 10 may be used to clean up the damage and improve the injectivity of water injection wells. By first determining the initial skin factor, using the step rate test described above, followed by monitoring the pressure decline after shut in of the well, a determination as to whether or not the well has been hydraulically fractured can be made. Pressure data taken from pressure sensor 16 before and during the shut in period are analyzed, using the standard reservoir engineering practices described in Advances in Well Test Analysis, SPE Monograph Volume 5, 1977, by R. C. Earlougher, Jr. A quarter slope of the decline curve plotted as a "Horner graph" is indicative of a fractured well. Thus, the calculated transient skin can be used to optimize the pumping volumes from matrix treatments, determine the optimized time to drop a diverter, evaluate the efficiency of a diverter, estimate the damage radius, reservoir height and formation permeability, as well as determining the character of water injection wells.

Figure 7:
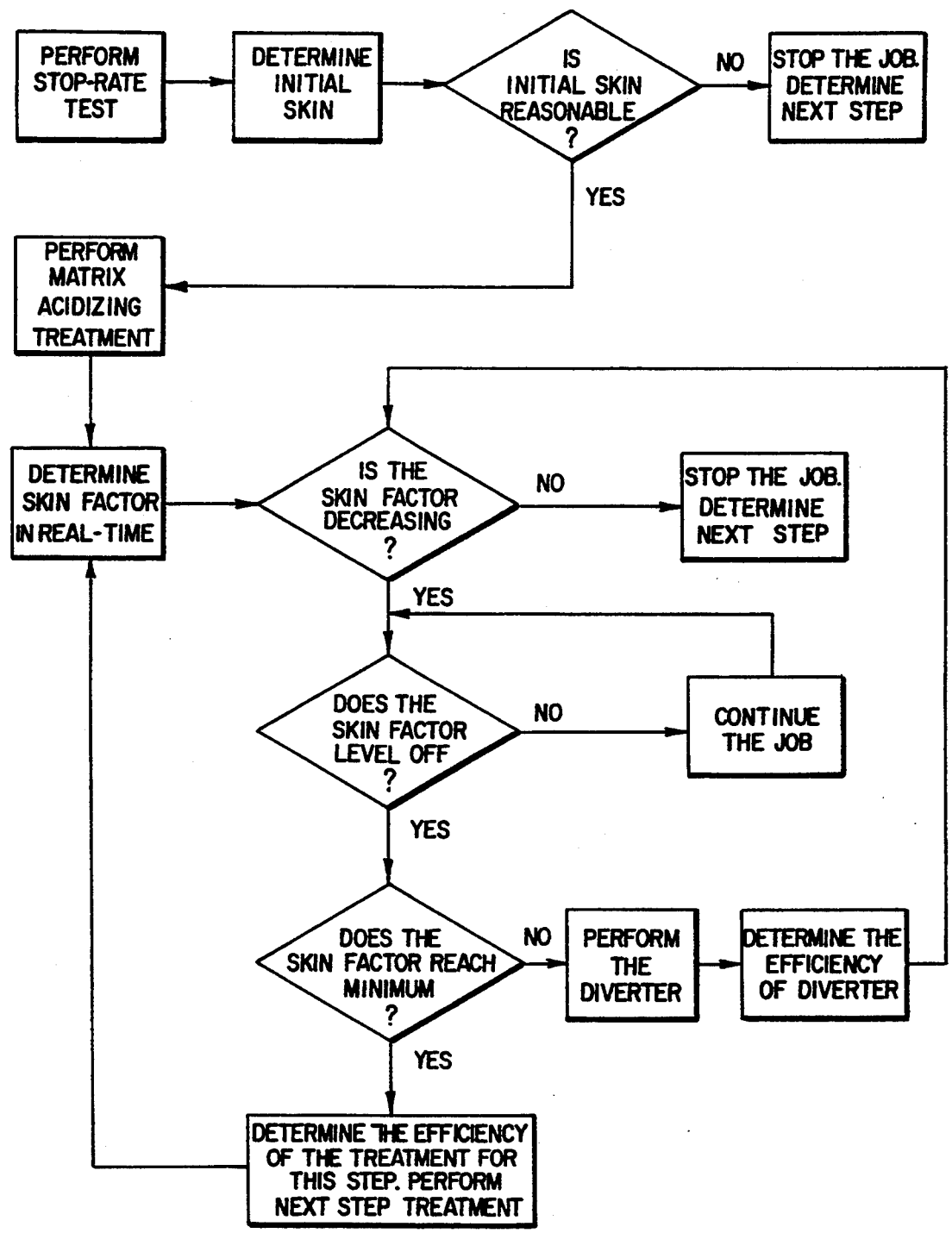
FIG. 7 is a flow chart of the preferred field procedure.

FIG. 7 is a flow chart of the an example field procedure for real time process time control of well stimulation. First, a step rate test is performed as described above in connection with FIG. 3. Once the initial skin factor is determined, it is reviewed by the operator to determine whether or not it is reasonable for the well in question. This review is based on historical information about that well or other information available to the operator. If it is determined not to be reasonable, the job is stopped and must be re-engineered. If however, the initial skin factor is determined to be reasonable, then a matrix acidizing treatment might be performed. During the conduct of the matrix acidizing treatment, skin factor is continuously determined using computer 18 and the software described above. If the skin factor is not decreasing at the beginning of the treatment, then the job should be stopped immediately and a different matrix acidizing treatment should be developed. If the skin factor begins decreasing the job should be continued until the skin factor levels off. Once the skin factor levels off, it must be determined as to whether or not the skin factor has been minimized. If not, a diverter as is well known in the art, may be added to the treatment and after determining the efficiency of the diverter, the real time determination and monitoring of the skin factor is once again determined as shown on FIG. 7. If the skin factor reaches a minimum, then the efficiency of the treatment for this step could be determined and the next step of the matrix acidizing process begun. Once again the skin factor is determined on a real time basis as is shown on FIG. 7 thereby allowing the treatment to be adjusted to optimize the entire process.

Having thus described our invention by reference to certain of its preferred embodiments, it is respectfully pointed out that the embodiments described are illustrative rather than limiting, and that many variations and modifications are possible within the scope of the present invention. Many such variations and modifications may appear obvious and desirable to those skilled in the art, based upon the foregoing description of preferred embodiments.

We claim:

1. An improved real-time method for indirectly monitoring the effect of matrix acidizing on the skin factor of a well, comprising:
   a. estimating the condition of the well;
   b. pumping a first matrix treatment fluid into the well;
   c. measuring the surface pressure at the well head;
   d. measuring the flow rate of the first matrix treatment fluid;
   e. calculating the skin factor of the well during the performance of steps b., c., and d. using an assumed value of K-h and the surface pressure;
   f. monitoring the value of skin factor calculated in step e. until there is no further change in the value of the skin factor; and
   g. changing a second matrix treatment fluid based on the lack of further decrease in the value of skin factor thereby maximizing the effectiveness of the matrix acidizing by maximizing the decrease in the value of the skin factor.

2. The method of claim 1 further comprising pumping a diverter material to the well.

3. The method of claim 1 wherein step a. includes measuring the condition of the well using a step rate-injectivity test.

4. The method of claim 1 wherein the calculating and monitoring steps are performed on a general purpose computer.

5. A system for matrix stimulation of a well which indirectly monitors the effect that the acidizing is having on the skin factor in the well, comprising:
   a. a general purpose computer which calculates on a real time basis the skin factor of a well undergoing a matrix stimulation process;
   b. a pressure sensor electrically connected to the computer to permit monitoring the well bore pressure; and
   c. a flow rate measuring device electrically connected to said computer for measuring the flow rate of a fluid being injected into the well bore.

6. The apparatus of claim 5 wherein the system includes a pump controlled by a computer.

7. The apparatus of claim 5 wherein the system includes a pump controlled by computer for providing different fluids.

8. The apparatus of claim 5 which includes valves for flow rate control.

9. An improved method for matrix stimulation using indirect monitoring of the effect of the matrix acidizing on the skin factor of a well, comprising:
   a. pumping a first matrix treatment fluid into the well;
   b. measuring the surface pressure at the well head;
   c. measuring the flow rate of the first matrix treatment fluid;
   d. calculating the skin factor of the well during the performance of steps a., b. and c., using an assumed value of K-h and the surface pressure;
   e. monitoring the value of skin factor calculated in step d until there is no further change in the calculated value of the skin factor thereby maximizing the effectiveness of the matrix acidizing by maximizing the decrease in the value of the skin factor.

10. The method of claim 9 further comprising pumping a diverter material to the well.

11. The method of claim 9 wherein step a. includes measuring the condition of the well using a step rate-injectivity test.

12. The method of claim 9 wherein the calculating and monitoring steps are performed on a general purpose computer.

* * * * *